US 6,748,663 B2

(12) United States Patent
Lindén

(10) Patent No.: US 6,748,663 B2
(45) Date of Patent: Jun. 15, 2004

(54) LOPPER

(75) Inventor: Erkki Olavi Lindén, Billnäs (FI)

(73) Assignee: Fiskars Consumer Oy AB, Billnas (FI)

( * ) Notice: Subject to any disclaimer, the term of this patent is extended or adjusted under 35 U.S.C. 154(b) by 29 days.

(21) Appl. No.: 10/222,003

(22) Filed: Aug. 15, 2002

(65) Prior Publication Data
US 2004/0031156 A1 Feb. 19, 2004

(51) Int. Cl.⁷ .............................................. B26B 13/06
(52) U.S. Cl. ......................................... 30/249; 30/188
(58) Field of Search ..................... 30/188, 189, 190, 30/237, 243, 249, 251

(56) References Cited

U.S. PATENT DOCUMENTS

| 102,752 | A | | 5/1870 | Bigelow | |
|---|---|---|---|---|---|
| 111,106 | A | * | 1/1871 | Calder | 30/251 |
| 247,128 | A | | 9/1881 | Stanley | |
| 425,820 | A | | 4/1890 | Nelson | |
| 1,135,989 | A | | 4/1915 | Breach | |
| 1,507,225 | A | * | 9/1924 | Barrett | 30/249 |
| 2,146,952 | A | | 2/1939 | Hamren | |
| 2,184,332 | A | * | 12/1939 | Bernay | 30/243 |
| 2,246,730 | A | * | 6/1941 | Hafdell | 30/237 |
| 2,259,642 | A | | 10/1941 | Hoyt | |
| 2,569,888 | A | | 10/1951 | Gustafson | |
| 2,704,052 | A | | 3/1955 | Wood | |
| 2,744,322 | A | | 5/1956 | Gustafson | |
| 3,317,997 | A | | 5/1967 | Hedstrom et al. | |
| 3,360,858 | A | * | 1/1968 | Cowley | 30/249 |
| 3,835,535 | A | | 9/1974 | Robison et al. | |
| 4,420,883 | A | | 12/1983 | Wallace et al. | |
| 4,649,646 | A | | 3/1987 | Lemcke | |
| 4,760,645 | A | | 8/1988 | Davis | |
| 5,020,222 | A | | 6/1991 | Gosselin et al. | |
| 5,084,975 | A | | 2/1992 | Melter | |
| 5,099,539 | A | | 3/1992 | Forester | |
| 5,241,752 | A | | 9/1993 | Lutzke et al. | |
| 5,745,998 | A | | 5/1998 | Le et al. | |
| 5,933,965 | A | | 8/1999 | Lindén et al. | |
| 5,950,315 | A | | 9/1999 | Lindén | |
| 6,038,773 | A | | 3/2000 | Le et al. | |
| 6,178,644 | B1 | | 1/2001 | Le et al. | |
| 6,345,445 | B1 | | 2/2002 | Schofield | |
| 6,526,644 | B2 | | 3/2003 | Miho et al. | |
| 6,526,664 | B2 | * | 3/2003 | Cech | 30/249 |

FOREIGN PATENT DOCUMENTS

| EP | 0 278 838 | * | 8/1988 |
|---|---|---|---|
| FR | 1.089.020 | | 3/1955 |
| GB | 110038 | | 10/1917 |

* cited by examiner

Primary Examiner—Hwei-Siu Payer
(74) Attorney, Agent, or Firm—Foley & Lardner LLP

(57) ABSTRACT

A lopper used to perform lopping, pruning and similar operations includes a lopping head having a spring-biased blade cooperating with a jaw, a drive mechanism connected to the lopping head and an elongate housing connected to the drive mechanism. The drive mechanism includes first and second mating portions selectively rotatable with respect to one another about an axis permitting positioning of the lopping head relative to the elongate housing, a first wheel rotatable about the axis, a second wheel rotatable about the axis and coupled to the blade by a head line, and a driving line arrangement comprising a driving line arranged to rotate the second wheel and the first wheel together when the driving line is drawn and to keep the second wheel stationary when the lopping head is positioned relative to the elongate housing 20 Claims, 1 Drawing Sheet

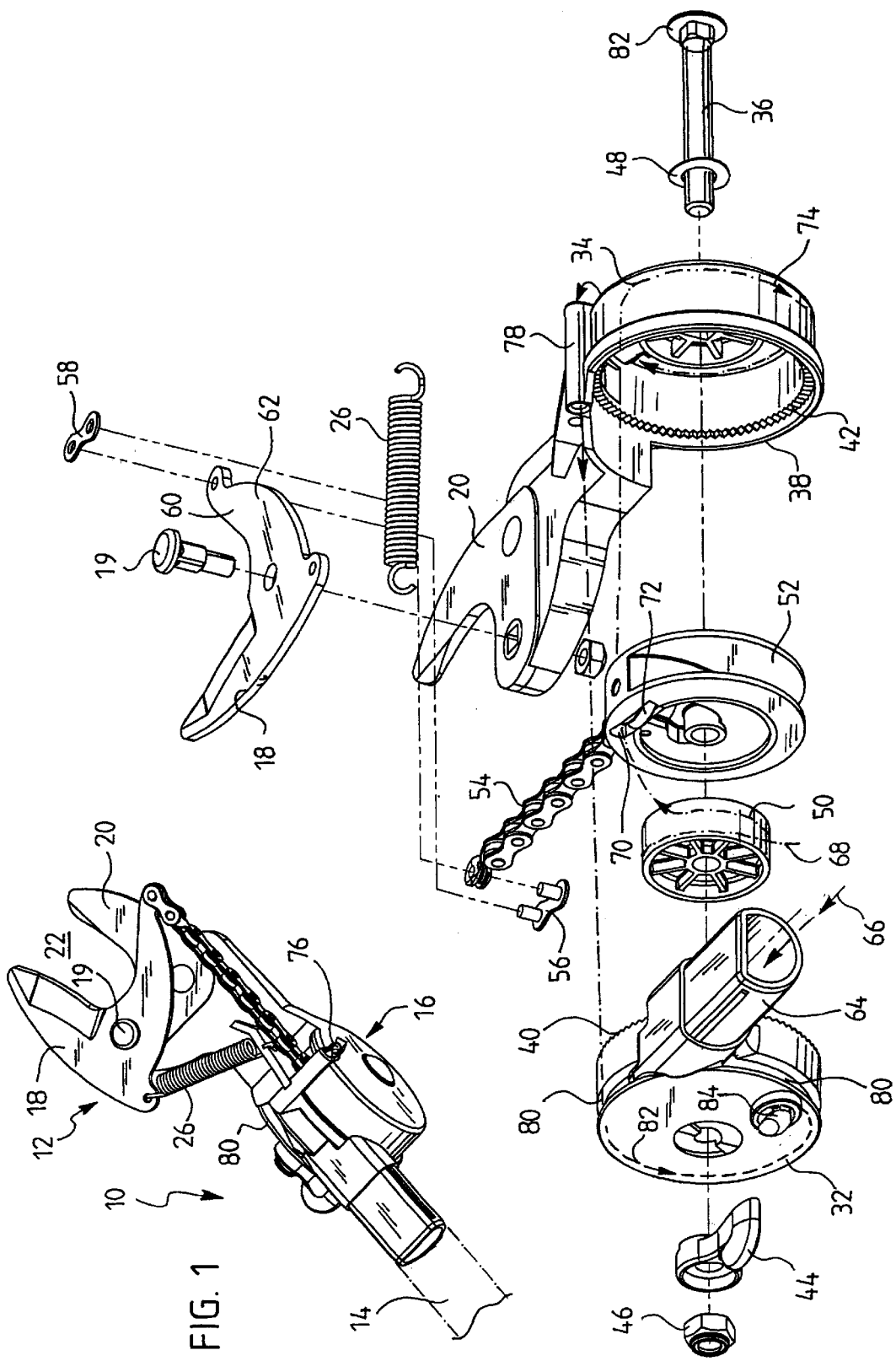

LOPPER

FIELD OF THE INVENTION

The present invention relates generally to the art of cutting tools, and particularly to shearing devices, such as loppers.

BACKGROUND OF THE INVENTION

The starting point of the lopper of the present invention, and thus the lopper according to the most closely-related background art related thereto, is disclosed in U.S. Pat. No. 5,950,315. Since most of the structural features of the lopper of the present invention correspond with those of the lopper disclosed in the above patent, it is incorporated herein by reference.

In the lopper known from the above patent, a spring-biased cutting blade which is pivotally turnable about a pivot point and which, together with a fixedly-positioned counter-blade, constitutes a jaw, is used by a drive mechanism which, through a chain, transmits power to the cutting blade. In the drive mechanism, the chain is attached to a chain wheel connected to a drive wheel connected to a driving line. A length of the driving line has been wound around the drive wheel. The chain wheel and the drive wheel are arranged to rotate together around a common axis, and when the driving line is drawn, both the drive wheel and the chain wheel connected thereto are made to rotate around their common axis. When the driving line is no longer drawn, the spring of the blade returns the driving line into its original position. Such a drive mechanism is simple and reliable.

The above-described drive mechanism does, however, have a problem. In the lopper described in the above-mentioned U.S. Pat. No. 5,950,315, the lopping head is further pivotally mounted relative to the elongate housing of the lopper to enable the angle of the lopping head to be adjusted with respect to the elongate housing. Such adjustment causes the driving line either to wind around the drive wheel or to be released therefrom. If the driving line winds, around the driving wheel, it simultaneously also winds the chain wheel which, in turn, directs a pulling force at the moving blade through the chain, changing the width of the jaw. In order for this change to be compensated for or cancelled out, the attachment at one end of the driving line to the elongate housing of the lopper has to be released, thus releasing more driving line in order to enable the maximum dimensions of the jaw to be returned. Even if this adjustment of the length of the driving line could be carried out in a simple manner with respect to the knot by which the driving line has been attached to the elongate housing, the fact that the length of the driving line is being adjusted nevertheless causes some additional inconvenience.

SUMMARY OF THE INVENTION

An object of the present invention is thus to further develop the lopper described in the above-mentioned U.S. Patent in such a way that the drive mechanism automatically compensates for the length of the driving line in order to enable the position of the lopping head to be adjusted relative to the elongate housing without the adjustment affecting the width of the jaw. This enables the need to adjust the dimensions of the jaw by adjusting the length of the driving line to be eliminated.

The above-mentioned object is achieved by means of a lopper according to the invention, the lopper comprising:

a lopping head having a spring-biased blade pivotally connected to a jaw about a pivot point, the jaw cooperating with the blade to sever a workpiece received in a bight formed by the jaw;
a drive mechanism connected to the lopping head;
an elongate housing connected to the drive mechanism;
the drive mechanism comprising:
   a first and a second mating portion selectively rotatable with respect to one another about an axis permitting positioning of the lopping head relative to the elongate housing, the first mating portion being connected to the elongate housing and the second mating portion being connected to the lopping head;
   a first wheel rotatable about the axis;
   a second wheel rotatable about the axis and coupled to the blade by a head line, the head line being connected to the second wheel at a first connecting point such that the head line is wound about a guiding surface of the second wheel as the second wheel rotates about the axis; and
   a driving line arrangement comprising a driving line arranged to rotate the second wheel and the first wheel together when the driving line is drawn and to keep the second wheel stationary when the lopping head is positioned relative to the elongate housing.

According to a preferred embodiment of the invention, the driving line arrangement comprises:

a through hole in the second wheel for allowing the driving line to, be led through the second wheel,
a first passage on the inner surface of the second mating portion for receiving a first portion of the driving line led through the second wheel, the first portion of the driving line sliding through the hole when the first and second wheel rotate together,
a second passage in the second mating portion for leading the driving line outside the second mating portion, the second passage turning with the second mating portion when the lopping head is positioned relative to the elongate housing, and
a third passage on the first, mating portion for receiving a second portion of the driving line, one end of the second portion of the driving line being at a second connecting point connected to the first mating portion and the length of the second portion of the driving line depending on the position of the lopping head relative to the elongate housing.

As is apparent from the above, the drive mechanism of the lopper of the invention has two operating states, one being the operating state prevailing when the lopper is used in an ordinary manner, and the other being the operating state prevailing when the angle of the lopping head is being adjusted with respect to the elongate housing. Both of these operating situations require that the length of the driving line should be compensated for separately from each other in order for the drive mechanism to operate as desired and to allow the position of the lopping head to be adjusted relative to the elongate housing without causing a need to adjust the length of the driving line in order to keep the dimensions of the jaw as desired.

BRIEF DESCRIPTION OF THE DRAWINGS

In the following, an exemplary embodiment of the invention will be described in greater detail with reference to the accompanying drawing, in which like reference numerals identify like elements, and in which FIG. 1 is an axonometric view showing a lopping head of a lopper of the invention, including the related drive mechanism but without a driving line, and FIG. 2 is an exploded view showing a section of the lopper shown in FIG. 1, illustrating how a driving line is led through the drive mechanism.

DETAILED DESCRIPTION OF PREFERRED EXEMPLARY EMBODIMENTS

The present invention relates to cutting tools, such as loppers. However, while the invention as described herein is, often referred to as a lopper, those skilled in the art will appreciate that the mechanism described herein and the principles of the operation thereof can broadly be applied to a wide variety of other cutting implements in general.

Referring to the figures, a tool or a lopper, which is generally designated by a reference number 10, for lopping, trimming and pruning operations includes a lopping head 12, an elongate housing 14 (only a part of which is shown), and a drive mechanism 16 disposed between the lopping head 12 and the housing 14. The lopping head 12 includes a blade 18 pivotable about a pivot point 19, and cooperating with a jaw 20 forming a bight 22 configured to receive a workpiece to be severed by the blade 18. A spring 26 biases the blade 18 to an open position relative to the jaw 20.

Since the present invention particularly relates to the drive mechanism 16, the following description will be focused on the operation of the drive mechanism, ignoring structural parts that relate to the lopping head and the operation thereof or to the elongate housing and the handles thereof or to the attachment of the driving line to these handles. Such parts may be identical in structure and operation with respect to what has been already disclosed about the corresponding parts in the above-mentioned U.S. Pat. No. 5,950,315.

According to the invention, the drive mechanism 16 comprises a first and a second mating portion 32 and 34, respectively, rotatable with respect to one another about an axis 36. The first mating portion 32 is connected to the elongate housing 14 and the second mating portion 34 is connected to the lopping head 12. A bolt constitutes the axis 36, which is also used for tightening the mating portions 32 and 34 against one another. The surface of portion 32 to be arranged against portion 34 is equipped with serrations 40 and it is arranged to be inserted inside a flange 38 in the portion 34. The inside of the flange 38, i.e. the inner rim of the mating portion 34, is provided with counter-serrations 42 corresponding with the serrations 40. When the mating portions 32 and 34 are arranged against one another, the serrations on the opposing surfaces thereof set against each other, locking the mating portions in a desired position respective to each other. Only by loosening the force pressing the mating portions 32 and 34 against each other is the mating portion 34 allowed to rotate with respect to the mating portion 32.

As mentioned above, the mating portion 32 is connected to the elongate housing 14 which enables the lopping head of the lopper of the invention to be brought to a desired height in order to cut off branches at the particular height. Rotating the mating portion 34 with respect to the mating portion 32 thus means that the angle of the lopping head is adjusted with respect to the elongate housing 14. Such adjustment of the angle is usually preferable in order to enable branches to be cut off at a desired angle. In practice, the above-mentioned loosening of the mating portions 32 and 34 with respect to each other takes place by turning a wing nut 44 arranged around the axis 36 underneath a locking nut 46 to be wound at an end of the axis. The wing nut 44 sets against the outer surface of the mating portion 32 and, as shown by FIG. 2, this outer surface, underneath the wing nut 44, is provided with a counter-surface ascending in a ramp-like manner for the wing nut 44 in order to enable a tightened and a loosened position to be achieved between the mating portions 32 and 34 by winding the wing nut 44 between two rotation positions. In the loosened position, the mating portions 32 and 34 can be wound respective to each other. Even in this loosened position, the axis bolt 36 is provided with an appropriate tightness between the mating portions 32 and 34 by means of a spring washer 48 arranged between a head 82 of the axis bolt 36 and the outer surface of the mating portion 34.

As its main parts, the drive mechanism 16 for moving the blade 18 comprises two wheels: a drive wheel 50 and a chain wheel 52. The chain wheel 52 is connected to the blade 18 by a head line 54 (e.g. by locking parts 56 and 58). As shown in the figures, the head line 54 is preferably a chain. Nevertheless, those skilled in the art will readily appreciate that a rope, a cable or a strap could also be suitable for use as the head line 54. One end of the head line 54 is connected to the chain wheel 52 at a connecting point. The other end of the head line 54 is connected to a region 60 of an arm 62 of the blade 18 extending away from a pivot 19. The chain wheel 52 comprises a trough to receive the chain 54 when the chain wheel 52 rotates around the axis 36 during a cutting motion of the lopper. As can be seen in FIG. 2, the chain wheel 52 sets inside the mating portion 34. Since, in the drive mechanism of the invention, the blade 18 is not subjected to a pulling force when the rotation position of the mating portion 34 is being adjusted with respect to the mating portion 32, the chain wheel 52 turns along with the mating portion 34 when this adjustment is being carried out.

The drive mechanism further comprises a second wheel, i.e. the drive wheel 50. This wheel is also located on the axis 36, and once the drive mechanism has been assembled, the drive wheel 50 resides inside the mating portion 32. Contrary to the drive wheel 52, this wheel does not turn around the axis 36 when the position of the lopping head 12 is being adjusted with respect to the elongate housing 14 of the lopper of the invention.

The functions described above, i.e. the operation of the lopping head on one hand and the adjustment of the angle of the lopping head with respect to the elongate housing of the lopper on the other, are implemented mainly based on the manner in which the driving line driving the lopping head is arranged inside the drive mechanism. In FIG. 2, the driving line and the way in which it is positioned inside the drive mechanism are illustrated by a broken line and the related arrows, which indicate the direction in which the driving line travels from the elongate housing of the lopper through the drive mechanism to its point of attachment.

The driving line enters the drive mechanism through a hollow shaft 64 of the first mating portion 32. At this point, the driving line is designated by a reference number 66. Next in the direction of entry, the driving line is led around the drive wheel 50 such that when the lopping head 12 is in its normal position, i.e. substantially parallel with the elongate housing of the lopper, the driving line winds slightly more than one round around the drive wheel. This section of the driving line is designated by a reference number 68. After winding the slightly more than one round around the drive wheel 50, the driving line has been led through the chain wheel 52. This through hole is designated by a reference number 70 and it is located close to the outer rim of the chain wheel such that the driving line is able to move from the rim of the driving wheel 50 substantially in the direction of the axis 36 through the through hole 70, the edges at the entrance of the through hole thus not causing friction to the driving line.

In order to enable the driving line to travel through the through hole 70 also otherwise as smoothly and with as low a friction as possible, the chain wheel 52 is provided with a substantially rectangular opening equipped with a pivotally mounted wheel 72. The rotation axis of this wheel is perpendicular to the axis passing through the chain wheel 52, i.e. to the direction of the bolt 36. The rim of the wheel 72 is equipped with a U-shaped trough, the radius of curvature of the U-shaped trough substantially corresponding with the radius of curvature of the O-shaped driving line; consequently, one half of the driving line falls into the trough provided on the rim of the wheel 72. This ensures that in practice, the driving line does not slip with respect to the wheel 72 but the travel of the driving line through the chain wheel 52 is based on the rotation of the wheel 72. This means that the friction of the driving line with respect to the through hole 70 is extremely low.

After traveling through the chain wheel 52, the driving line makes less than one round in a shallow trough-like space provided at the bottom of the second mating portion 34. This section of the driving line is designated by a reference number 74. After traveling the less than one round at the bottom of the mating portion 34, the driving line emerges on the outer surface of the mating portion 34 through the bottom surface, i.e. on the surface, which in FIG. 2 is located in the direction of the head 82 of the bolt 36. The backward surface is provided with a relatively short trough 76 for the driving line; this is shown in FIG. 1. Through this trough, the driving line is led into a tubular through hole 78, which protects the driving line from external damage to which the driving line would be exposed at this point if it were more openly disposed on the surface of the drive mechanism.

The tubular through hole 78 enables the driving line to be led from the mating portion 34 in the direction of the axis 36 to the mating portion 32. There, it is circumferentially led into a trough-like space 80 provided along the outer surface of the mating portion 32. The section of the driving line traveling in this trough-like space is designated by a reference number 82. The length of this trough-like section is about ¾ of the length of one round. After traveling this particular distance in the trough 80, the driving line is led from the trough 80 through an opening provided in a side thereof, onto the surface of the mating portion 32 where the wing nut 44 and the locking nut 46 reside. After traveling through this through hole 84, the driving line is provided with a knot to prevent the travel of the driving line through the opening 84. This provides an attachment point for an end of the driving line in the mating portion 32.

The operation of the drive mechanism of the lopper of the invention, and particularly the operation of the driving line thereof in different operating situations, will be described in the following. When the lopper of the invention is used in a normal manner, the section 66 of the driving line is drawn, the result being that the section 68 of the driving line directs to the drive wheel 50 a force trying to turn it. The force rotates the drive wheel 50 and the chain wheel 52 therewith. This, in turn, through the chain 54, directs a driving force at the moving blade 18 and against the pulling force of the spring 26. When the drive wheel in this operating situation rotates around its axis, it draws the driving line from the side of the chain wheel 52, discharging the driving line outwards through the shaft 64 of the mating portion 32. In practice, this section of the driving line is obtained from the section 74 of the driving line located on the bottom of the mating portion 34. During the cutting motion of the lopper, the mating portion 34 remains stationary while the chain wheel 52 rotates therein, the section 74 of driving line thus being gradually discharged via the through hole 70 through the chain wheel 52 onto the drive wheel 50, being further discharged therefrom through the hollow shaft 64 of the mating portion 32. In this normal operating situation, the drive wheel 50 and the chain wheel 52 thus turn together.

In the above-described situation, the section 74 of the driving line located at the bottom of the mating portion 34 thus compensates for the additional need for the driving line caused by the driving line not being directly attached to the chain wheel 52 but being continued through the chain wheel in order to achieve a desired operation in accordance with the invention to enable the angle of the lopping head to be adjusted without causing a need to adjust the length of the driving line.

As has become apparent above, the angle of the lopping head 12 is adjusted respective to the longitudinal direction of the elongate housing of the lopper by rotating the mating portion 34 connected to the lopping head 18 with respect to the mating part 32 connected to the elongate housing 14. According to the invention, this turning or rotation should not cause the section 66 of the driving line to be drawn, which means that during the adjustment, the position of the blade 18 with respect to the counter-blade 20 also remains unchanged. This requires a special arrangement; one such arrangement is shown in FIG. 2.

In order to prevent a pulling force from being directed at the blade 18 when the mating portion 34 is rotated, the chain wheel 52 has to rotate along with the mating portion 34 when the adjustment is being carried out. On the other hand, the position of the drive wheel 50 has to be fixed in order to ensure that the section 66 of the driving line is not being pulled. In practice, then, when the angle is being adjusted, the drive wheel 50 remains stationary while the chain wheel 52 rotates with respect to the drive wheel 50. Depending on the direction in which the lopping, head 12 is rotated, i.e. the mating portion 34 is rotated with respect to the mating portion 32, either more driving line is wound onto the drive wheel 50 or the driving line is discharged therefrom. If the mating portion 34 is rotated in the direction wherein the section 68 of the driving line wounds around the drive wheel, more driving line is wound onto the drive wheel 50. Since the chain wheel 52 rotates along with the mating portion 34, no section 74 of the driving line is released while the angle is being adjusted. The additional driving line is thus obtained from the section 82 of the driving line which resides in the trough 80 of the mating portion 32.

As can be seen in FIG. 2, rotating the mating portion 34 in the above-mentioned direction means that the through hole 78 therein rotates with respect to the mating portion 32. The section 82 of the driving line located in the trough 80 is thus partly allowed to be released from the trough 80 and to pass through a through hole tube 78, and further into the trough located on the bottom of the mating portion 34 and, through the through hole 70 in the chain wheel 52, onto the drive wheel 50. Similarly, when the lopping head is rotated in the opposite direction to that mentioned above, i.e. in the opposite direction to that of the driving line on the drive wheel 50, the driving line on the drive wheel 50 is released, being allowed to travel in the opposite direction to the previously-mentioned one through the through hole 70 via the trough located on the bottom of the mating portion 34, and through the through hole 78 into the trough 80 on the outer rim of the mating portion 32. In different operating situations, the section of the driving line residing on the drive wheel 50 and the section of the driving line residing in the trough 80 thus compensate for each other in length such that the adjustment of the angle of the lopping head 12 with respect to the elongate housing of the lopper causes no need to adjust the length of the driving line and, consequently, does not change the width of the jaw while such adjustment is being carried out. Naturally, the above-described operation requires that the diameter of the drive wheel 50 and the diameter of the trough 80 should be dimensioned appropriately with respect to each other, i.e. in practice, their diameters should be substantially equal in size.

It is understood that the above description is of a preferred exemplary embodiment of the present invention, and that the invention is not limited to the specific forms described above. For example, while the invention has been described in association with a device taking the form of a lopper, it can be used with other items as well. The drive wheel and the chain wheel can have other configurations while preserving their essential function that is described above. Nevertheless, it should be understood that these and other substitutions, modifications, changes and omissions may be made in the design and arrangement of the elements disclosed herein without departing from the scope of the appended claims.

What is claimed is:

1. A lopper comprising:
    a lopping head having a spring-biased blade pivotally connected to a jaw about a pivot point, the jaw cooperating with the blade to sever a workpiece received in a bight formed by the jaw;
    a drive mechanism connected to the lopping head;
    an elongate housing connected to the drive mechanism;
    the drive mechanism comprising:
        a first mating portion and a second mating portion selectively rotatable with respect to one another about an axis permitting adjustment of the position of the lopping head relative to the elongate housing; the first mating portion being connected to the elongate housing and the second mating portion being connected to the lopping head;
        a first wheel rotatable about the axis;
        a second wheel rotatable about the axis and coupled to the blade by a head line, the head line being connected to the second wheel at a first connecting point such that the head line is wound about a guiding surface of the second wheel as the second wheel rotates about the axis; and
        a driving line arrangement comprising a driving line arranged to rotate the second wheel and the first wheel together when the driving line is drawn and to keep the first wheel stationary while the second wheel rotates when the position of the lopping head is adjusted relative to the elongate housing.

2. The lopper of claim 1, wherein a through hole is disposed near to a rim of the second wheel.

3. The lopper of claim 2, the through hole in the second wheel is partly bound by a rim of a third wheel pivoted in the second wheel rotatable about an axis perpendicular to the axis of the second wheel.

4. A lopper comprising:
    a lopping head having a spring-biased blade pivotally connected to a jaw about a pivot point, the jaw cooperating with the blade to sever a workpiece received in a bight formed by the jaw;
    a drive mechanism connected to the lopping head;
    an elongate housing connected to the drive mechanism;
    the drive mechanism comprising:
        a first mating portion and a second mating portion selectively rotatable with respect to one another about an axis permitting adjustment of the position of the lopping head relative to the elongate housing, the first mating portion being connected to the elongate housing and the second mating portion being connected to the lopping head;
        a first wheel disposed in the first mating portion rotatable about the axis;
        a second wheel disposed in the second mating portion rotatable about the axis and coupled to the blade by a head line, the head line being connected to the second wheel at a first connecting point such that the head line is wound about a guiding surface of the second wheel as the second wheel rotates about the axis; and
        a driving line arrangement comprising a driving line arranged to rotate the second wheel and the first wheel together when the driving line is drawn and to keep the first wheel stationary while the second wheel rotates when the position of the lopping head is adjusted relative to the elongate housing.

5. The lopper of claim 4, wherein the driving line arrangement comprises
    a through hole in the second wheel for allowing the driving line to be led through the second wheel,
    a first passage on the inner surface of the second mating portion for receiving a first portion of the driving line led through the second wheel, the first portion of the driving line sliding through the hole when the first wheel and the second wheel rotate together,
    a second passage in the second mating portion for leading the driving line outside the second mating portion, the second passage turning with the second mating portion when the lopping head is positioned relative to the elongate housing, and
    a third passage on the first mating portion for receiving a second portion of the driving line, one end of the second portion of the driving line being at a second connecting point connected to the first mating portion and the length of the second portion of the driving line depending on the position of the lopping head relative to the elongate housing.

6. The lopper of claim 5, wherein the third passage is an open trough running circumferentially on an outer surface of the first mating portion.

7. The lopper of claim 5, wherein the diameter of the first wheel is essentially the same as the diameter of the third passage.

8. The lopper of claim 5, wherein the second passage is tubular and disposed on the outer rim of the second mating portion.

9. The lopper of claim 5, wherein the through hole is disposed near to the a rim of the second wheel.

10. The lopper of claim 9, wherein the through hole in the second wheel is partly bound by a rim of a third wheel pivoted in the second wheel rotatable about an axis perpendicular to the axis of the second wheel.

11. A lopper comprising:
    a head including a blade pivotally connected to a jaw and configured to sever a workpiece;
    a drive mechanism including a first mating portion coupled to an elongate housing and a second mating portion coupled to the head, the first mating portion and the second mating portion rotatable relative to one another about an axis to adjust the position of the head;

a first wheel rotatable about the axis;

a second wheel rotatable about the axis and coupled to the blade by a head line; and a driving line configured to rotate the first wheel and the second wheel to actuate the blade and configured to rotate the second wheel while the first wheel remains stationary when the second mating portion is rotated to adjust the position of the head.

12. The lopper of claim 11 wherein the first wheel is housed at least partially within the first mating portion and the second wheel is housed at least partially within the second mating portion.

13. The lopper of claim 11 wherein the first mating portion and the second mating portion comprise serrations configured to hold the first mating portion and the second mating portion in a desired position.

14. The lopper of claim 13 further comprising a locking device configured to permit movement of the first mating portion and the second mating portion to another desired position.

15. the lopper of claim 11 wherein the blade is substantially free of a pulling force from the head line when the second mating portion is adjusted relative to the first mating portion.

16. The lopper of claim 11 wherein second wheel comprises a hole and the driving line extends through the hole.

17. The lopper of claim 16 further comprising a third wheel positioned within the hole for engaging the driving line.

18. The lopper of claim 11 wherein the second mating portion comprises a trough and the driving line extends at least partially within the trough.

19. The lopper of claim 11 wherein an angle of the head with respect to the elongate housing is adjustable by rotating the second mating portion relative to the first mating portion.

20. The lopper of claim 11 wherein a diameter of the second wheel is greater than a diameter of the first wheel.

* * * * *

UNITED STATES PATENT AND TRADEMARK OFFICE
CERTIFICATE OF CORRECTION

PATENT NO. : 6,748,663 B2
DATED : June 15, 2004
INVENTOR(S) : Linden, Olavi Erkki It is certified that error appears in the above-identified patent and that said Letters Patent is hereby corrected as shown below:

Column 7,
Line 55, following "claim 2," insert -- wherein --.

Column 8,
Line 54, following "near to" delete "the".

Signed and Sealed this

Twelfth Day of April, 2005

JON W. DUDAS
*Director of the United States Patent and Trademark Office*